(12) United States Patent  (10) Patent No.: US 6,742,499 B2
Viele et al.  (45) Date of Patent: Jun. 1, 2004

(54) METHOD AND APPARATUS FOR DETECTING ABNORMAL COMBUSTION CONDITIONS IN LEAN BURN RECIPROCATING ENGINES

(75) Inventors: Matthew Viele, Fort Collins, CO (US); Luigi P. Tozzi, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 9 days.

(21) Appl. No.: 10/286,353

(22) Filed: Nov. 1, 2002

(65) Prior Publication Data

US 2004/0084017 A1 May 6, 2004

(51) Int. Cl.[7] .................................................. F02D 41/14
(52) U.S. Cl. .................. 123/406.14; 123/479; 73/35.08
(58) Field of Search ........................ 123/406.14, 406.16, 123/406.24, 406.26, 406.27, 406.28, 406.29, 406.34, 406.37, 406.38, 406.39, 479, 494; 73/35.08

(56) References Cited

U.S. PATENT DOCUMENTS

| | | | |
|---|---|---|---|
| 5,769,049 A | | 6/1998 | Nytomt et al. |
| 5,777,216 A | | 7/1998 | Van Duyne et al. |
| 5,803,047 A | | 9/1998 | Rask |
| 5,925,819 A | * | 7/1999 | Yoshinaga et al. ......... 73/117.3 |
| 5,992,386 A | | 11/1999 | Nytomt et al. |
| 6,029,627 A | | 2/2000 | VanDyne |
| 6,105,552 A | * | 8/2000 | Arisawa et al. ......... 123/406.37 |
| 6,474,302 B2 | * | 11/2002 | Takahashi et al. ...... 123/406.21 |
| 6,550,312 B1 | * | 4/2003 | Hohner et al. ............. 73/35.08 |
| 6,561,163 B1 | * | 5/2003 | Takahashi et al. ...... 123/406.21 |
| 2003/0164025 A1 | * | 9/2003 | Kiess et al. ................ 73/35.08 |

FOREIGN PATENT DOCUMENTS

JP 14049 * 1/1999 ............. F02N/5/12

* cited by examiner

*Primary Examiner*—Hai H. Huynh
(74) *Attorney, Agent, or Firm*—Leydig, Voit & Mayer, Ltd.

(57) ABSTRACT

An apparatus and method to detect abnormal combustion conditions for use as a feedback control of a lean burn reciprocating engine using ionization signals is presented. The system receives a succession of ionization signals for successive cycles of a running engine and processes a plurality of related ionization signals for signal stability. The ionization signals are checked to determine if an abnormal combustion condition such as knock or misfire has occurred. The variation of an ionization signal that changes with respect to an engine parameter over a combustion event of the lean burn reciprocating engine operating with an air to fuel ratio corresponding to a lambda ($\lambda$) greater than 1.4 is measured and a floating bounded space is associated with the ionization signal. An indication that the abnormal combustion condition has been detected is provided if a portion of the ionization signal is within the floating bounded space.

41 Claims, 11 Drawing Sheets

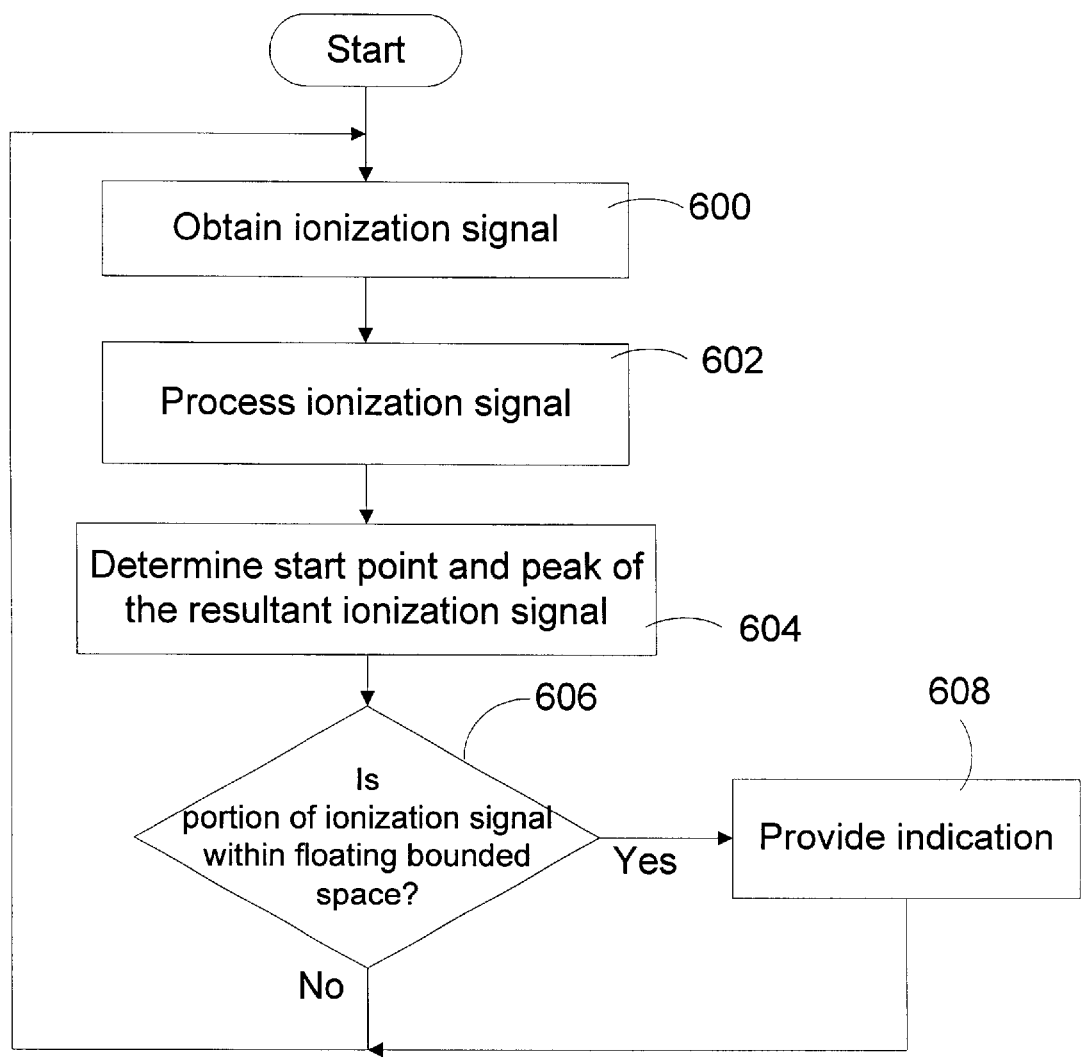

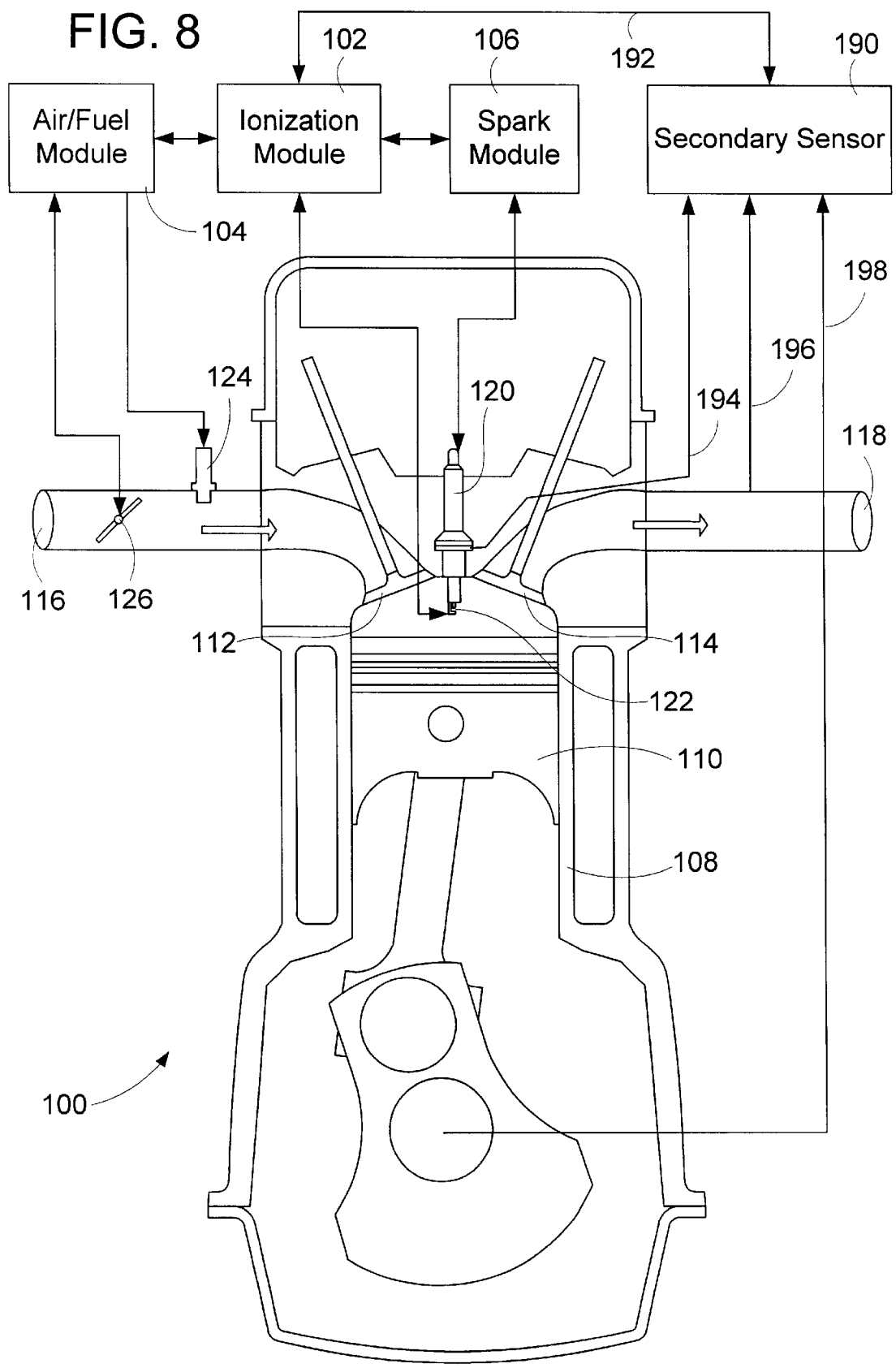

METHOD AND APPARATUS FOR DETECTING ABNORMAL COMBUSTION CONDITIONS IN LEAN BURN RECIPROCATING ENGINES

FIELD OF THE INVENTION

The present invention relates generally to ignition systems in spark ignited engines, and more particularly relates to such systems in lean burn engines in which the excess air factor $\lambda$ is greater than 1.4.

BACKGROUND OF THE INVENTION

Industry has developed various techniques using ionization signals for detecting abnormal combustion conditions such as misfire, knock, and approximate air/fuel ratio for stochiometric engines. Free ions present in the combustion gases are electrically conductive and are measurable by applying a voltage across an ionization probe. Alternatively, the voltage is applied across the electrodes of a spark plug after the spark plug has ignited the combustion mixture. The applied voltage induces a current in the ionized gases which is measured to provide the ionization signal. The ionization signal is used as a control parameter in the control of the engine. For example, in U.S. Pat. No. 6,029,627, ionization signals and a single $O_2$ sensor in the exhaust are used to control the air/fuel ratio in engines to achieve stoichiometric operation. This technique uses the $O_2$ sensor to achieve stoichiometry of the overall stoichiometric mixture of the engine and then equalizes the amplitude or location of the first local peak of the ionization signal in each individual cylinder. Another technique disclosed in U.S. Pat. No. 5,992,386 performs a frequency analysis of the ionization signal to detect abnormal combustion conditions such as knock. These systems integrate the ionization signal and compare the magnitude of the integrated signal to the magnitude of the integrated signal of a normal combustion event. The abnormal combustion condition is detected if the magnitude of the integrated signal is above a threshold level, which is set above the magnitude of the integrated signal of a normal combustion event.

One of the drawbacks of stochiometric engines is the emission of pollutants. With fixed engine timing and load, the $NO_x$, emissions level of a typical gas engine is dependent upon the air/fuel ratio. Near a chemically correct (i.e., stoichiometric) ratio, the $NO_x$, emissions peak and then drop significantly as the amount of excess air is increased. Maintaining a stable combustion process with a high air/fuel ratio is difficult to manage. As a result, conventional spark-ignited gas engines typically operate near the stoichiometric air/fuel ratio and depend upon exhaust after treatment with catalytic converters to reduce the $NO_x$ emissions.

Government agencies and industry standard setting groups are reducing the amount of allowed emissions in an effort to reduce pollutants. As a result, industry is moving towards using lean burning engines to reduce emissions despite the difficulty of maintaining a stable combustion process in lean burning engines. By using more air during combustion, turbocharged lean-burn engines can enhance fuel efficiency without sacrificing power and produce less nitrous oxide pollutants than conventional stoichiometric engines.

Ionization sensing has not been utilized to any significant extent in these lean burn engines. Because of the lean nature of the mixture, the ionized species concentration, including $NO_x$, is much less than at stoichiometric conditions. As a result, the ionization signal is of very low intensity and has great variability. The techniques developed using ionization signals for stochiometric operation are unsuitable for lean burn operation and do not work. For example, the ionization signals of some lean burn engines are sufficiently variable and are low enough in magnitude that integrating the signal can not be done reliably due to a number of factors. These factors include higher levels of noise relative to the ionization signal magnitude, the variability of the ionization signal, and the low magnitudes of the resultant integrated signal.

BRIEF SUMMARY OF THE INVENTION

In view of the foregoing, an object of the present invention is to reliably detect abnormal combustion conditions such as misfire and knock of lean burn engines based on ionization signals.

The foregoing objects are among those attained by the invention, which provides a method of detecting an abnormal combustion condition in a combustion chamber of a lean burn reciprocating engine. The abnormal combustion condition includes misfire and knock. The method measures the variation of an ionization signal that changes with respect to an engine parameter over a combustion event of the lean burn reciprocating engine operating with an air to fuel ratio corresponding to a lambda ($\lambda$) greater than 1.4, associates a floating bounded space with the ionization signal, determines if a portion of the ionization signal is within the floating bounded space, and provides an indication that the abnormal combustion condition has been detected if the portion of the ionization signal is within the floating bounded space.

A method to determine the floating bounded space and a starting point for the floating bounded space is also disclosed. The method includes receiving a set of ionization signals that change with respect to an engine parameter over a combustion event. The set of ionization signals has ionization signals corresponding to normal combustion conditions and ionization signals corresponding to at least one abnormal combustion condition for an engine operating with an air to fuel ratio corresponding to a $\lambda$ greater than 1.4. The method further includes the step of adjusting the starting point and size of the floating bounded space such that selected portions of the ionization signals corresponding to the at least one abnormal combustion condition reliably fall within the floating bounded space and the ionization signals corresponding to normal combustion conditions reliably fall outside the floating bounded space.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 4b is a graphical representation of pressure and ionization current versus engine piston crank angle for an incipient knock event of the spark plug design of FIG. 4a;

FIG. 4c is a graphical representation of pressure and ionization current versus engine piston crank angle for a severe knock event of the spark plug design of FIG. 4a;

FIG. 5b is a graphical representation of pressure and ionization current versus engine piston crank angle for an incipient knock event of the spark plug design of FIG. 5a;

FIG. 5c is a graphical representation of pressure and ionization current versus engine piston crank angle for a severe knock event of the spark plug design of FIG. 5a;

FIG. 6 is a flow chart illustrating the steps to determine an abnormal combustion condition in accordance with the teachings of the present invention;

FIG. 8 is a schematic view illustrating the use of a secondary source in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention provides an apparatus and method to detect abnormal combustion conditions in a lean burn reciprocating engine using ionization signals. As used herein, a lean burn reciprocating engine is a reciprocating engine operating with an air/fuel ratio corresponding to an excess-air factor lambda ($\lambda$) greater than 1.4, typically in the range of 1.4 to 1.85, and preferably in the range of 1.67 to 1.82. The excess-air factor is related to the air-fuel ratio according to the equation $$\lambda = \frac{\text{Actual air/fuel ratio}}{\text{Stoichiometric air/fuel ratio}}$$

The excess-air factor $\lambda$ indicates the amount that the air/fuel ratio is above or below a stoichiometric mixture. For example, a $\lambda$=1.4 corresponds to an air/fuel ratio that is 140% of stoichiometric.

Figure 1A:
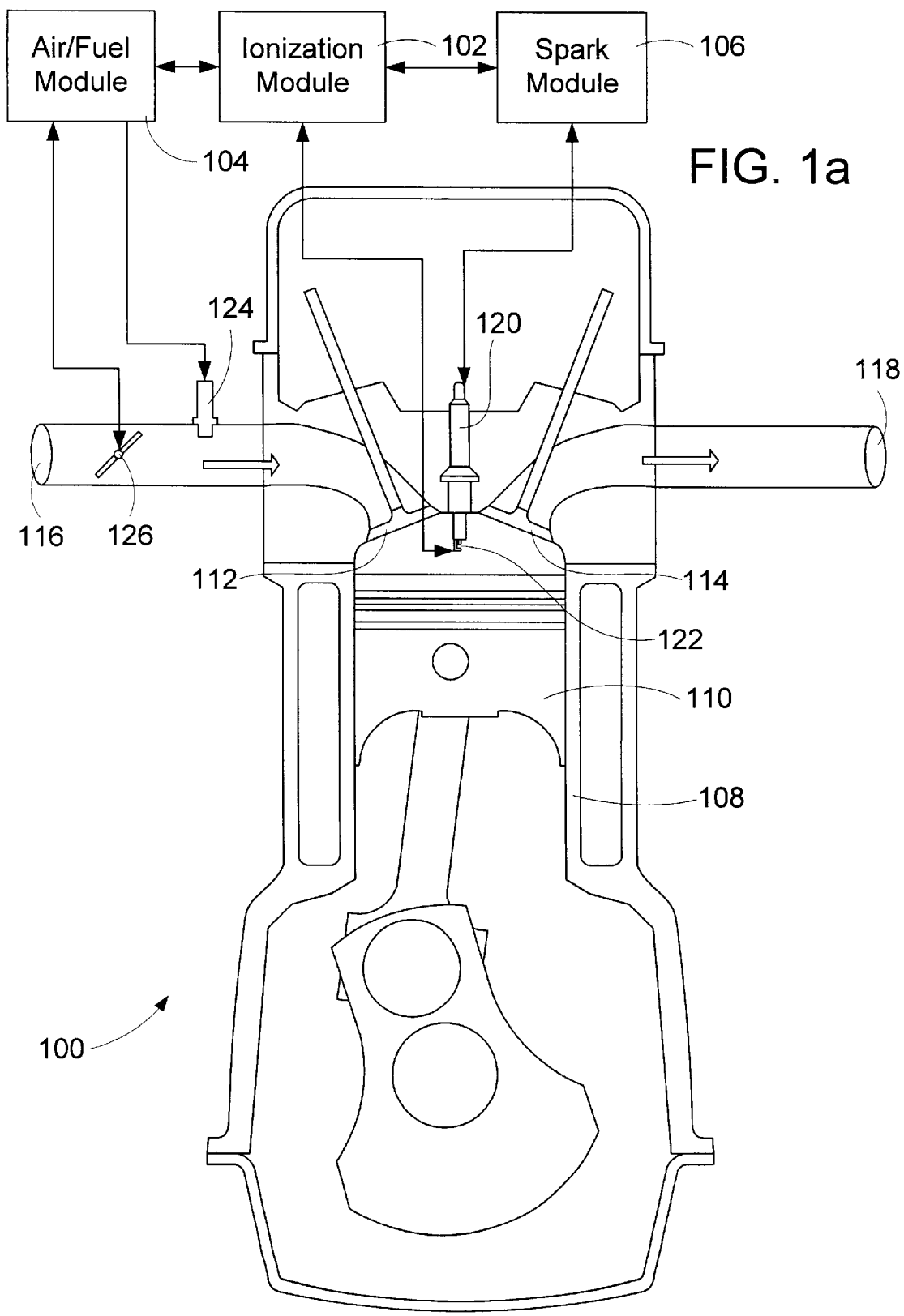
FIG. 1*a* is a schematic view of an air/fuel ratio control of the present invention.

Referring initially to FIG. 1a, a system 100 exemplifying the present invention is shown. The system includes an ionization module 102, an air/fuel module 104, a spark module 106, and a reciprocating engine. While the ionization module 102, the air/fuel module 104 and the spark module 106 are shown separately, it is recognized that the modules 102, 104, 106 may be combined into a single module or be part of an engine controller having other inputs and outputs. The reciprocating engine includes engine cylinder 108, a piston 110, an intake valve 112 and an exhaust valve 114. An intake manifold 116 is in communication with the cylinder 108 through the intake valve 112. An exhaust manifold 118 receives exhaust gases from the cylinder 108 via the exhaust valve 114. The intake valve 112 and exhaust valve 114 may be electronically, mechanically, hydraulically, or pneumatically controlled or controlled via a camshaft. A spark plug 120 with a spark gap 122 ignites the air/fuel mixture in cylinder 108. Spark module 106 controls ignition timing and provides power to the spark plug 120.

Figure 1B:
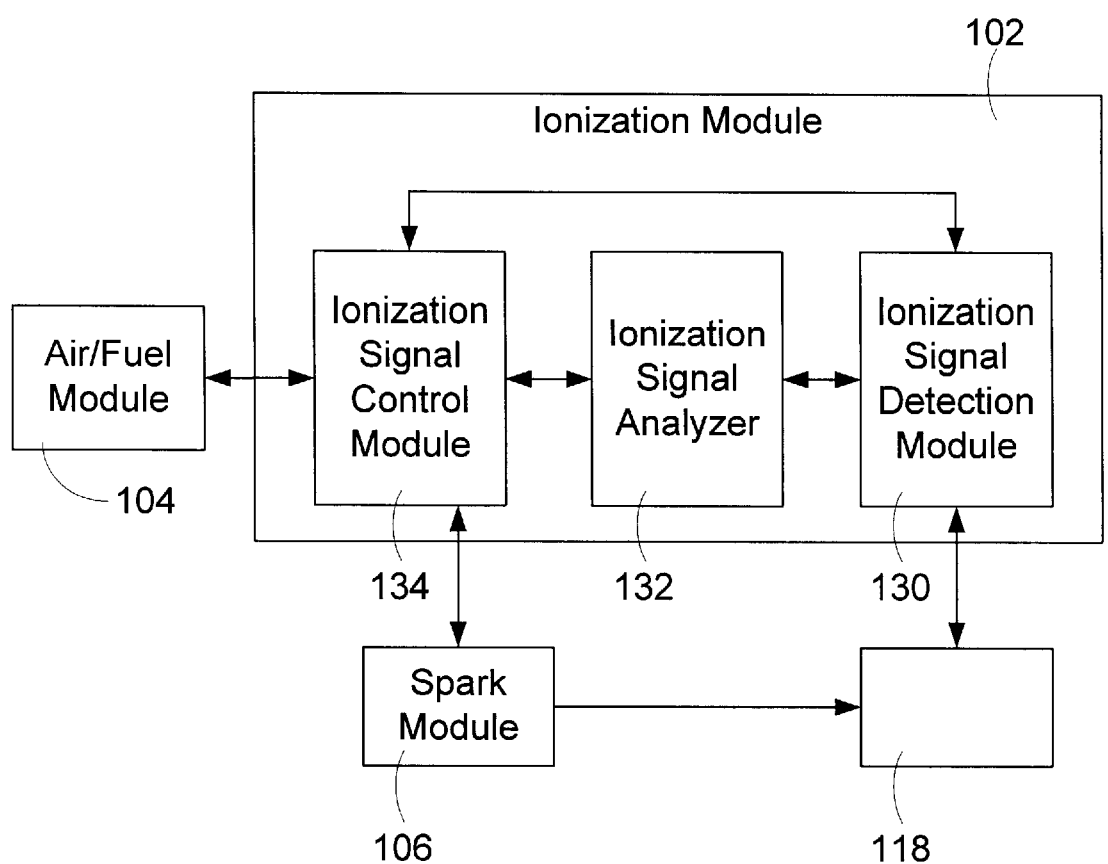
FIG. 1*b* is a block diagram of the ionization module of FIG 1*a;*

The ionization module contains circuitry for detecting and analyzing the ionization signal. In the illustrated embodiment, as shown in FIG. 1b, the ionization module includes an ionization signal detection module 130, an ionization signal analyzer 132, and an ionization signal control module 134. In order to detect abnormal combustion conditions, the ionization module 102 supplies power to the spark gap 122 after the air and fuel mixture is ignited and measures ionization signals from the spark gap 122 via ionization signal detection module 130. Alternatively a conventional ionization probe or other conventional device to detect ionization may be used to measure the ionization signals. Ionization signal analyzer 132 receives the ionization signal from ionization signal detection module 130 and determines if an abnormal combustion condition exists. The ionization signal control module 134 controls ionization signal analyzer 132 and ionization signal detection module 130. The ionization signal control module 134 provides an indication to the air/fuel module 104 and spark module 106 of the abnormal combustion condition as described below. In one embodiment, the ionization module 102 sends the indication to other modules in the engine system such as an engine controller. While the ionization signal detection module 130, the ionization signal analyzer 132, and the ionization signal control module 134 are shown separately, it is recognized that they may be combined into a single module and/or be part of an engine controller having other inputs and outputs.

Returning now to FIG. 1a, the air/fuel module 104 controls fuel injection 124 and may control throttle valve 126 to deliver air and fuel, at a desired ratio, to the engine cylinder 108. The air/fuel module 104 receives feedback from the ionization module and adjusts the air/fuel ratio as described below.

The ionization signal is proportional to the air/fuel ratio of the fuel mixture. The air/fuel ratio of the mixture is higher in lean burn engines (i.e., the amount of fuel is lower) than in stochiometric engines. The lower amount of fuel relative to air results in a lower flame temperature, which translates into a lower number of free ions present in the combustion gases. In addition, the spark plug design in conjunction with the gasdynamic and thermodynamic characteristics of the combustion event greatly affect the magnitude and repeatability of ion signal. For example, systems having spark plugs having a high electrode surface area and electrodes that are mostly shielded from the combustion chamber air flow provide higher magnitude and more consistent ionization signals than other types of spark plugs. On the other hand, the ionization signal is not easy to detect or process in lean burn engines using conventional "J-gap" automotive type spark plugs because the signal is of very low intensity and has great variability. Prior art systems that use the energy delivered to ignite the fuel mixture to detect the ionization signal will not work properly because these system will get a weak signal or no signal at all. The preferred form of the present invention supplies power to the spark gap after the air and fuel is ignited to measure ionization signals. Additional free ions flow when the additional power is applied, thereby resulting in an ionization signal that is easier to detect.

The ionization signal is acquired with respect to an engine parameter over the combustion cycle. For example, the engine parameter may be crank angle, time after ignition, time from top dead center, etc. Crank angle is used herein in its most generic sense to include all of these. For example, crank angle is intended to be generic to measurement of the engine rotational parameter no matter whether it is measured directly in terms of crank angle degrees, or measured indirectly or inferred by measurement. It may be specified with respect to top dead center, with respect to ignition point, etc. Abnormal combustion conditions such as misfire and knock are detected at specific points in the combustion cycle. These points are where the ionization signal of the abnormal combustion condition has a signal characteristic that is different from ionization signals of normal combustion conditions. For example, misfire occurs when the ionization signal remains at or near an initial value for an extended interval of the combustion cycle. A misfire condition is often due to an inadequate air/fuel ratio (e.g., too lean), spark timing, and/or spark characteristics.

In order to detect abnormal combustion events in a lean burn engine, a floating bounded space is associated with the ionization signal (measured with respect to a combustion event) to detect the abnormal combustion conditions. The floating bounded space is a space that is located at a position in the combustion cycle and sized such that a portion of the ionization signal will reliably be within the space during the abnormal combustion condition and reliably be outside the space during normal combustion conditions. The position of the floating bounded space is a function of an engine timing parameter (e.g., crank angle, time, etc.) and the size is a function of the engine timing parameter and ionization signal magnitude. For example, a floating bounded space shaped as a box has one axis (e.g., length) of the box in units of the engine parameter (e.g., crank angle) and the other axis (e.g., height) of the box in units of ionization signal magnitude. Preferably, a floating bounded space is used for each abnormal combustion condition (e.g., a floating bounded space for misfire, a floating bounded space for incipient knock, a floating bounded space for severe knock, etc.).

When the ionization signal reaches the point in the combustion cycle where the floating bounded space has been positioned, the ionization signal magnitude is compared to the magnitude range of the floating bounded space. The ionization module 102 indicates that an abnormal combustion condition has occurred if the ionization signal is within the floating bounded space according to criteria described below. Use of the floating bounded space according to the invention overcomes the problems associated with prior art integrating techniques. The effect of noise is reduced by eliminating the integration of the ionization signal. Integration is implicitly a filtering operation that can miss short bursts of activity that are indicative of combustion conditions. In lean burn combustion these short bursts may be the only difference between a normal combustion condition and an abnormal combustion condition. The floating bounded space detects the short bursts. The variability in the ionization signal is accounted for during a calibration process when the floating bounded space is sized and positioned as described herein.

Signal characteristics of the ionization signal are used to characterize each abnormal combustion condition and to determine at what point in the combustion cycle that the abnormal combustion condition can be reliably detected. The floating bounded space is derived to capture the signal characteristic of the ionization signal indicative of the abnormal combustion condition and is associated with the ionization signal. In the description that follows, the details of determining the starting position and the size of the floating bounded space will be discussed and then the details of detecting an abnormal combustion condition will be described. A floating box shall be used to describe positioning and sizing the floating bounded space. The ionization signal will be acquired with respect to crank angle. It is recognized that any shape may be used for the floating bounded space and the ionization signal can be acquired with respect to other engine parameters.

Figure 2:
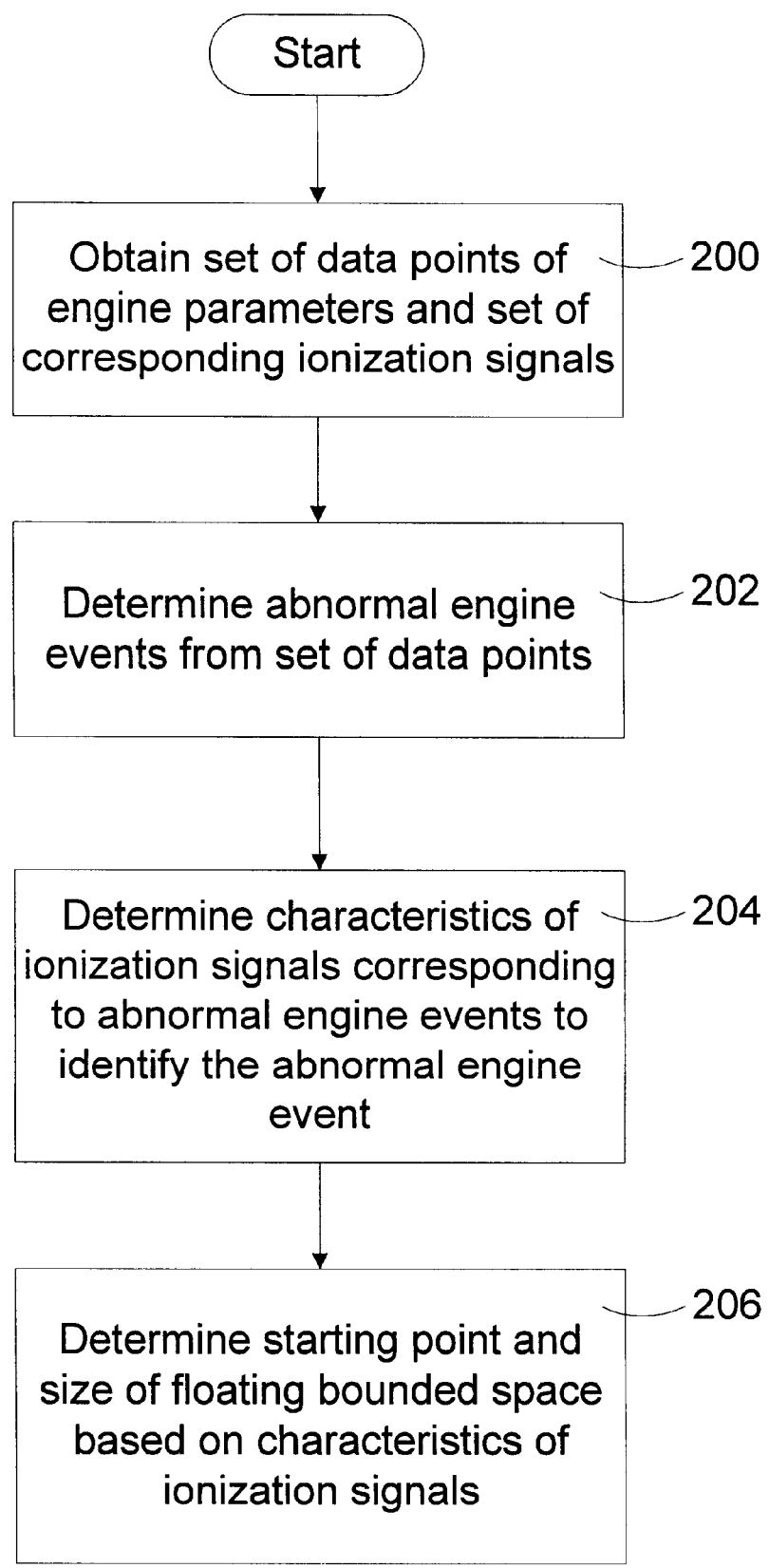
FIG. 2 is a flow chart illustrating the steps to characterize an engine and determine parameters of a floating bounded space in accordance with the teachings of the invention.

Turning now to FIG. 2, the overall steps of the tuning process are shown. The tuning process determines the starting position and the size of the floating bounded space. The process also determines an air/fuel ratio limit for a given spark characteristic and spark timing at which the engine has a high likelihood of misfire if the engine is operating with an air/fuel ratio above the air/fuel ratio limit. As the air/fuel ratio becomes leaner, the probability of misfire increases. The air/fuel ratio limit is set based upon operating constraints. For example, an engine may be allowed to misfire a percentage of the number of cycles during operation while another engine may never be allowed to misfire. The limit is set to a richer air/fuel ratio if the engine is not allowed to misfire than the air/fuel ratio of an engine that is allowed to misfire during operation. Although air/fuel ratio and spark timing are key control parameters, it is recognized that other engine parameters can be used to control an engine (e.g., percent EGR, waste gate and throttle position, etc.). A set of data points of engine parameters that can be used to determine the abnormal combustion condition and a set of corresponding ionization signals at various operating conditions of the lean burn engine is obtained (step 200). The set of data points of engine parameters may be indicated mean effective pressure (IMEP) of the cylinder, air/fuel ratio, or any other engine parameter that can be used to determine when the abnormal combustion condition has occurred. A test engine is typically used to obtain the set of data points and learn the characteristics of the engine during normal and abnormal operating conditions. The use of a test engine allows sensors and diagnostic equipment to be used that are typically not available in production engines. For example, the IMEP of a cylinder is generally not acquirable in production engines from cylinder pressure sensors because production engines generally do not have pressure sensors in each cylinder due to cost and reliability issues. In some lean burn systems, the ionization signal may be noisy. In these systems, the set of corresponding ionization signals are acquired using filters to filter the ionization signal. For example, a moving average filter can be used where the number of data points to average is defined based upon signal characteristics of the ionization signal.

The abnormal combustion condition is determined from the set of data points (step 202). For example, a misfire can be detected using the IMEP of a cylinder. A misfire occurs if the IMEP is below a defined threshold. In one embodiment this threshold is a predetermined percentage of the nominal value of IMEP for the cylinder. The ionization signals corresponding to the abnormal combustion condition are compared to the ionization signals of normal combustion conditions to determine characteristics of the ionization signal that can be used to identify the abnormal event (step 204). The starting point and size of the floating box is then determined using the characteristics of the ionization signals (step 206). In one embodiment, the starting point and size is determined by looking at the abnormal combustion conditions and determining the upper and lower extremes in the data set. The floating box is sized and positioned at one extreme and then the floating box is tuned at the other extreme. The floating box is preferably sized and positioned with sets of data points acquired at different operating conditions. The floating box parameters (i.e., size and position) may vary with engine operating conditions, such as speed, engine load, and desired air/fuel ratio. For example, the size of the floating box is different at engine idle and full power.

Figure 3A:
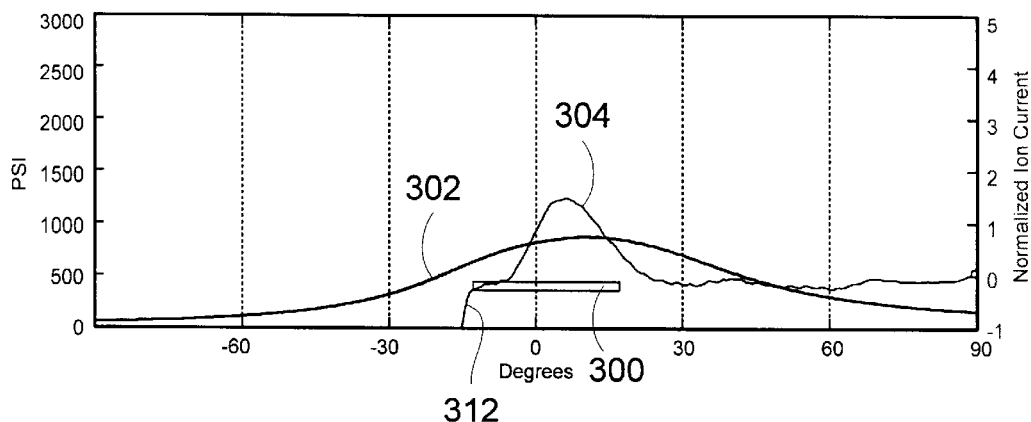
FIG. 3*a* is a graphical representation of pressure and ionization current versus engine piston crank angle for a normal combustion event.
Figure 3B:
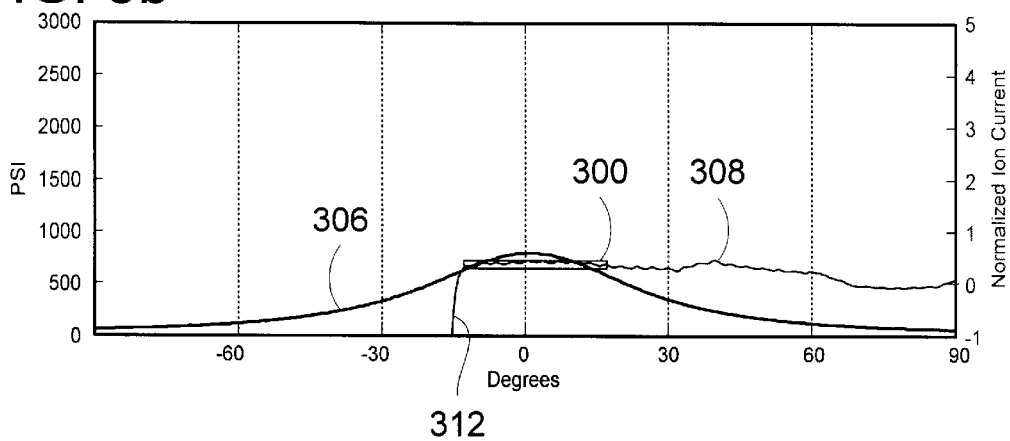
FIG. 3*b* is a graphical representation of pressure and ionization current versus engine piston crank angle for a misfire event.
Figure 3C:
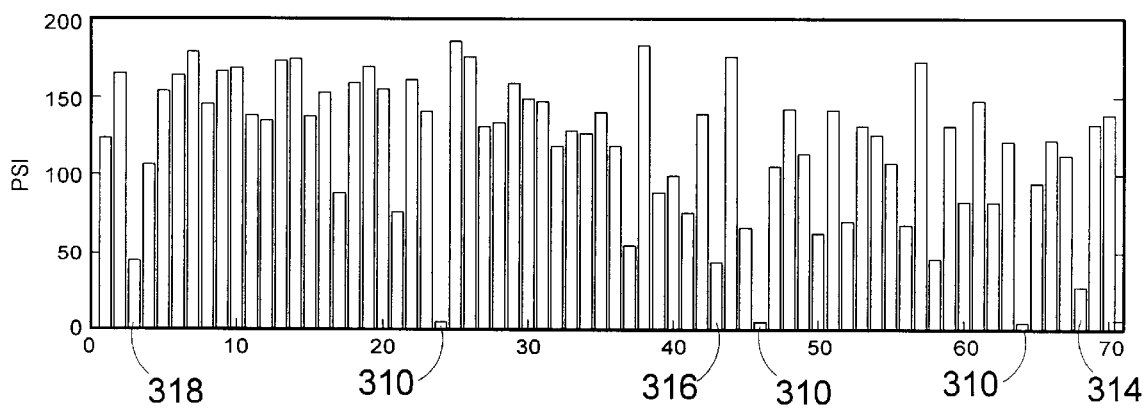
FIG. 3c is a graphical illustration of experimental data showing a correlation between indicated mean effective pressure of an engine cylinder and misfire that is used in sizing the floating bounded space of the present invention.

Turning now to FIGS. 3a–3c, the floating box 300 for a misfire event is shown. FIG. 3a is an illustration of a representative cylinder pressure 302 and ionization signal 304 of a normal combustion condition. FIG. 3b is an illustration of a representative cylinder pressure 306 and ionization signal 308 for a misfire condition. A representative set of data points of the engine parameter for 70 engine cycles is shown in FIG. 3c. The engine parameter used is the IMEP of a cylinder. If the IMEP of any data point is below a selected amount, the data point is classified as a misfire condition. The selected amount should be set to a point that detects all the misfires. In one embodiment, the selected amount is a predetermined percentage of nominal. Data points 310 in FIG. 3c correspond to a misfire condition. It can be seen that the ionization signal 304 of a normal combustion condition has an initial short flattened portion from the initial starting point followed by a peaked portion. In contrast, the misfire condition remains substantially constant for a given duration. One characteristic of a misfire condition in the ionization signal for many engines is that a portion of the ionization signal remains substantially constant from the initial starting point 312 of the ionization signal for an extended interval as can be seen in FIG. 3b and can be confined within a bounded space. It is recognized that other characteristics may be used.

The tuning process is used to determine the starting point and size of the floating box using the characteristics of the ionization signals. The tuning process adjusts the size and position of the floating box to reliably capture the misfire condition and exclude the normal combustion condition. The starting point and size of the floating box is adjusted until the floating box is of sufficient size and at a location of the ionization signal with respect to crank angle such that a portion of the ionization signal of a misfire condition reliably remains within the floating box 300 for the duration of the floating box 300 as shown in FIG. 3b and leaves the floating box 300 for a normal combustion condition as shown in FIG. 3a. This is accomplished by overlaying the floating box on the ionization signals corresponding to the normal and abnormal combustion cycles shown in FIG. 3c and adjusting the box parameters (e.g., starting point (with respect to crank angle (i.e., time) and ionization signal magnitude), duration, and height) to optimize the box. For example, the floating box is superimposed on ionization signals corresponding to the upper and lower extremes of data points 310 (i.e., the misfire conditions) in the engine being characterized and the box parameters are adjusted such that the portion of the ionization signal reliably remains within the box for each condition. The floating box is then superimposed on the ionization signal for the normal ionization signals that are closest in form to the ionization signals for misfire conditions. For example, the ionization signals corresponding to data points 312, 314, and 316 are likely to be closest in shape or form to ionization signals corresponding to misfire conditions. The floating box is then adjusted until the portion of the ionization signal of the normal combustion condition is not captured by the floating box. This process is repeated for all of the ionization signals in the data set for the various engine operating conditions (e.g., speed, engine load, desired air/fuel ratio, etc.) to ensure that the floating box reliably captures misfire conditions and excludes other conditions. The box parameters are then used during engine operation to detect misfire conditions.

During operation, the ionization signal analyzer 132 receives the ionization signal. It floats the floating box over the ionization signal in accordance with the box parameters. In one embodiment, the lowest magnitude of the ionization signal is determined beginning at the starting point of the floating box and ending at the boundary of the floating box (i.e., for the duration of the floating box). For example, if the duration of the floating box is thirty degrees of crank angle, the lowest magnitude of the ionization signal is determined over the thirty degrees of crank angle. The starting point of the floating box is then positioned at the starting point crank angle (i.e., time after ignition) at the lowest magnitude of the ionization signal. The ionization signal analyzer 132 then determines if the ionization signal remains within the floating box over the duration of the floating box. The ionization signal analyzer 132 provides an indication to the ionization signal control module 134 that a misfire has been detected if the ionization signal remains within the floating box over the duration of the floating box. FIG. 3b illustrates the ionization signal remaining within the floating box over the duration of the floating box.

The ionization signal control module 134 provides an indication to the air/fuel module 104 and spark module 106 of the misfire condition and to other modules such as the engine controller. The air/fuel module 104 and spark module 106 (or the engine controller), in turn, determine what action to take. The actions that can be taken include advancing the ignition timing and/or running the engine richer (e.g., adding more fuel to the air/fuel mixture) or doing nothing until a predetermined number of misfires have occurred and then advancing the ignition timing and/or running the engine richer. The air/fuel module 104 controls fuel injection 124 and/or throttle valve 126 and spark module 106 controls the spark timing to move the engine away from the misfire condition in accordance with the action decided to be taken (e.g., advancing the ignition timing and/or running the engine richer).

Figure 4A:
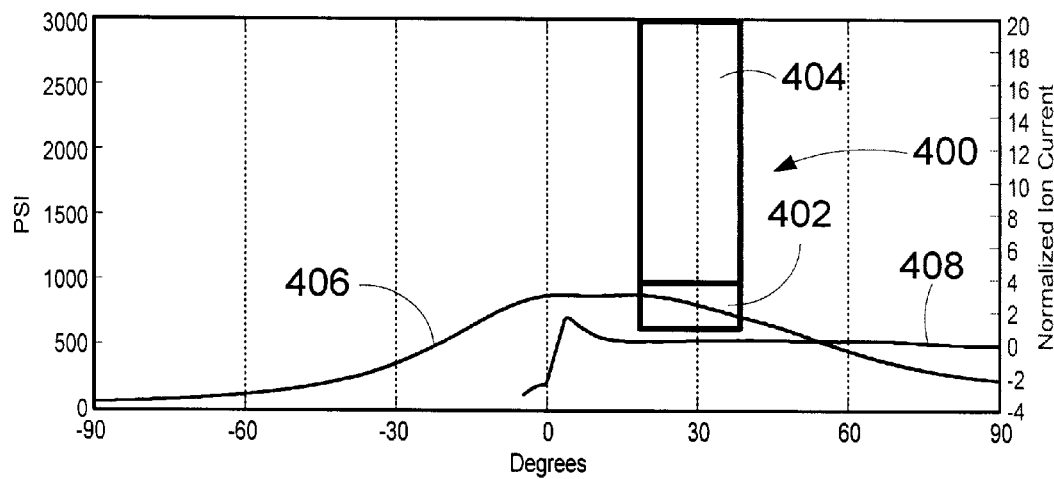
FIG. 4a is a graphical representation of pressure and ionization current versus engine piston crank angle for a normal combustion event of a spark plug design having a high electrode surface area and electrodes that are mostly exposed to combustion chamber air flow.
Figure 4B:
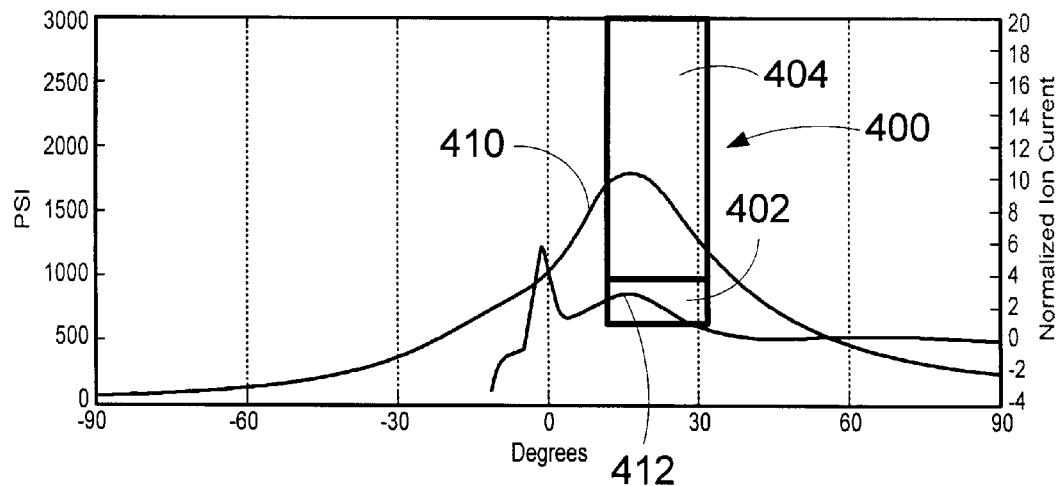
Figure 4C:
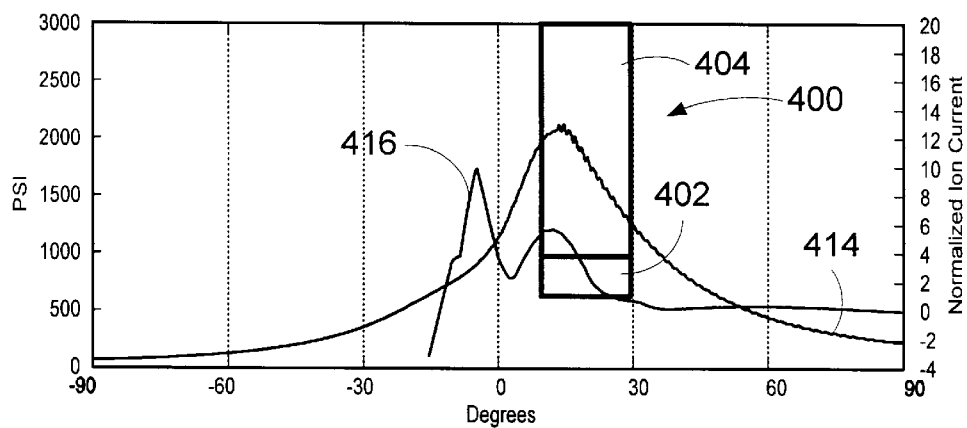
Figure 4D:
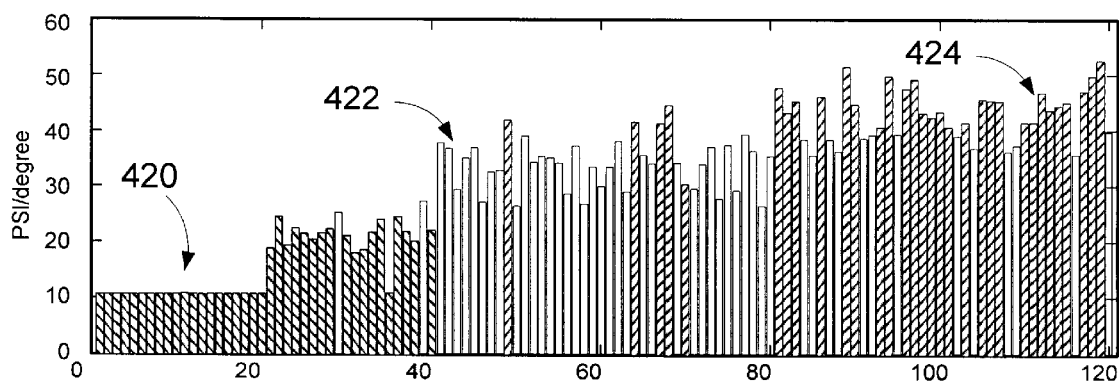
FIG. 4d is a graphical illustration of experimental data showing a correlation between the peak of the derivative of pressure of an engine cylinder as a function of crank angle and incipient knock and severe knock of the spark plug design of FIG. 4a that is used in sizing the floating bounded space of the present invention.

The ionization signals are substantially different in overall form or shape for different types of plugs. For example, the ionization signal may have a secondary peak in some spark plugs and has no secondary peak in other types of spark plugs. This means that prior methods used to detect knock based on the presence of a secondary peak in the ionization signal will not work with certain types of spark plugs. The present invention is adaptable to many or most such types of spark plugs in that the engine is characterized with the spark plug types that are used in production engines. Turning now to FIGS. 4a–4d, the floating bounded space 400 for knock is shown for a spark plug having a secondary peak. The onset of the second peak is an indication of knock. The floating bounded space 400 is sized, positioned and in this case subdivided to include a lower portion 402 and an upper portion 404 to detect incipient knock and severe knock respectively. Incipient knock occurs when the magnitude of knock is minimal and the knock won't cause immediate damage to the engine. Severe knock occurs when the magnitude of the knock is such that the knock is causing or is about to cause damage to the engine. FIG. 4a is an illustration of a representative cylinder pressure 406 and ionization signal 408 of a normal combustion condition. FIG. 4b is an illustration of a representative cylinder pressure 410 and ionization signal 412 of an incipient knock condition. FIG. 4c is an illustration of a representative cylinder pressure 414 and ionization signal 416 for a severe knock condition. Knock occurs when pressure changes quickly. As a result, the engine parameter selected for characterizing the ionization signal is the peak of the derivative of pressure of a cylinder with respect to engine crank angle. Other engine parameters could be used. A representative set of data points of the engine parameter is shown in FIG. 4d. Acceptable knock 420, incipient knock 422, and severe knock 424 levels are shown.

A threshold level of the peak of the derivative of pressure of a cylinder is chosen for incipient knock and a higher threshold level of the peak of the derivative of pressure of a cylinder is chosen for severe knock. The threshold level for incipient knock is chosen such that the knock won't cause immediate damage to the engine. The threshold level for severe knock is chosen such that the knock is about to do some damage to the engine. If the peak of the derivative of pressure of a cylinder is below the threshold level for incipient knock, any knock present is within an acceptable level of knock. If the peak of the derivative of pressure of a cylinder is above the threshold level for incipient knock and below the threshold for severe knock, the knock is defined as incipient knock. If the peak of the derivative of pressure of a cylinder is above the threshold level for severe knock, the knock is defined as severe knock. For purposes of illustration, the threshold level for incipient knock is set to a value of 25 and the threshold level for severe knock set to a value of 45. It is recognized that the threshold levels must be determined during engine characterization and are based on the knock tolerance level of the engine. The starting point and size of the lower portion is determined by adjusting the starting point and size until the lower portion is of sufficient size and at a location with respect to the ionization signal and crank angle such that any portion of the ionization signal for an incipient knock condition reliably falls within the lower portion 402 and remains outside the upper portion 404 as illustrated in FIG. 4b. The starting point and size of the upper portion is determined by adjusting the starting point and size until the lower portion is of sufficient size and at a location such that any portion of the ionization signal for a severe knock condition reliably falls within the upper portion 404 as illustrated in FIG. 4c.

In one embodiment, the starting point is a fixed amount of time after the ignition event and the duration of the floating box 400 is a fixed amount of time. This time can be in terms of actual time or in terms of crank angle and is determined from the data points illustrated in FIG. 4d. The ionization signal eventually goes to quasi steady state value. The bottom of the lower portion 402 is set to a point a fixed amount above the quasi steady state value and the top of the lower portion 402 is determined from the data points. The fixed amount above the quasi steady state value is determined from the data points and is set to a location such that the ionization signals of normal combustion conditions do not fall within the floating box 400. The top of the lower portion is determined such that incipient knock conditions fall within the lower portion 402 and remain outside the upper portion 404. During operation, the quasi steady state value is determined and the lower portion 402 of the floating box 400 is placed at the fixed amount of time after the ignition event at the fixed amount above the quasi steady state value. The ionization signal analyzer 132 provides an indication to the ionization signal control module 134 that incipient knock has been detected if the analyzer determines that the ionization signal falls within the lower portion 402 while remaining outside the upper portion 404. The ionization signal analyzer 132 provides an indication to the ionization signal control module 134 that severe knock has been detected if the analyzer determines that the ionization signal falls within the upper portion 404.

Figure 5A:
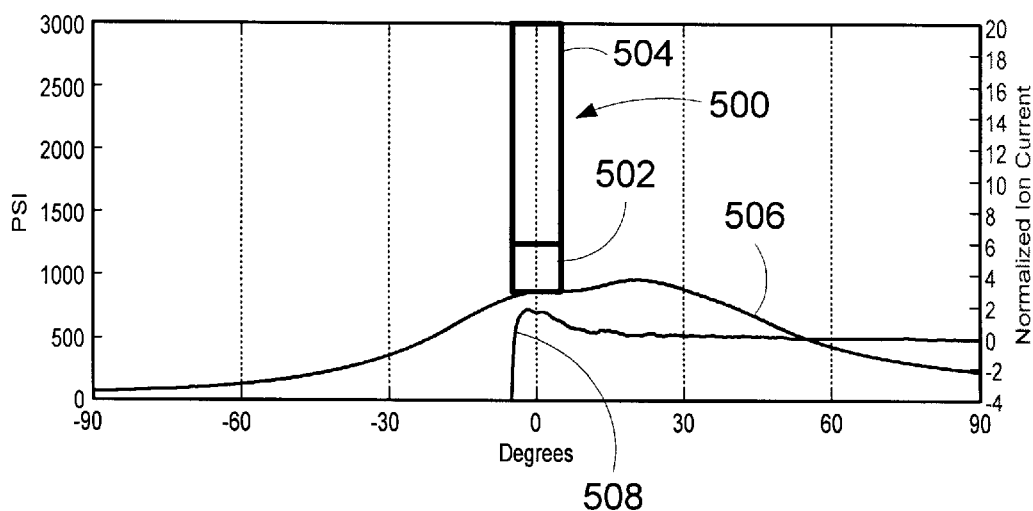
FIG. 5a is a graphical representation of pressure and ionization current versus engine piston crank angle for a normal combustion event of a spark plug design having a high electrode surface area and electrodes that are mostly shielded from combustion chamber air flow.
Figure 5B:
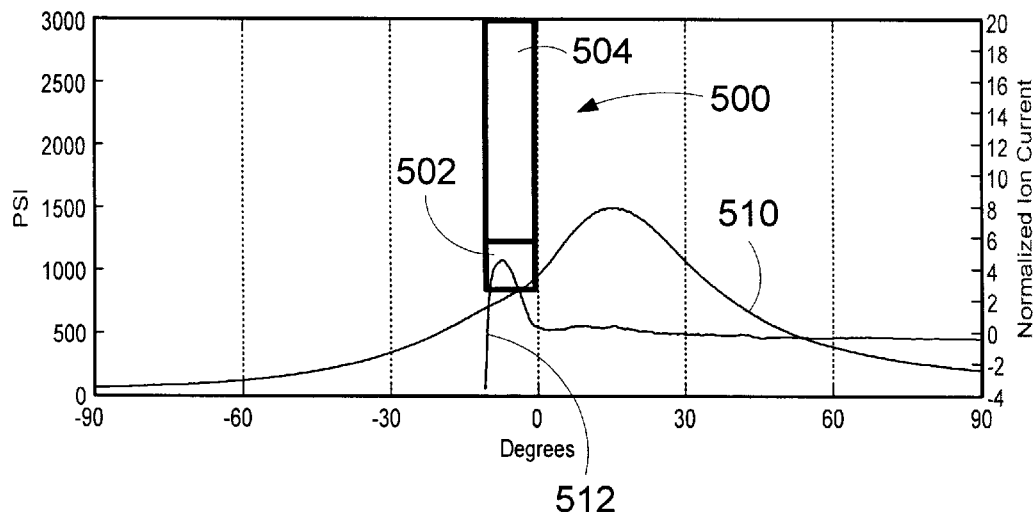
Figure 5C:
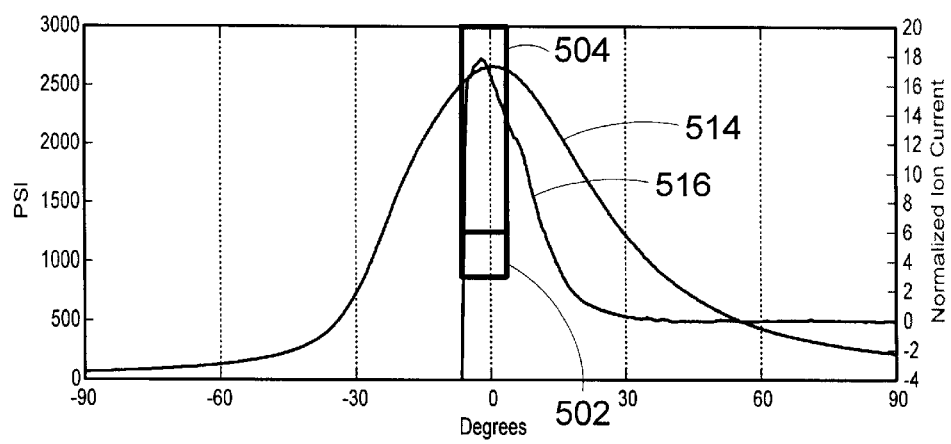
Figure 5D:
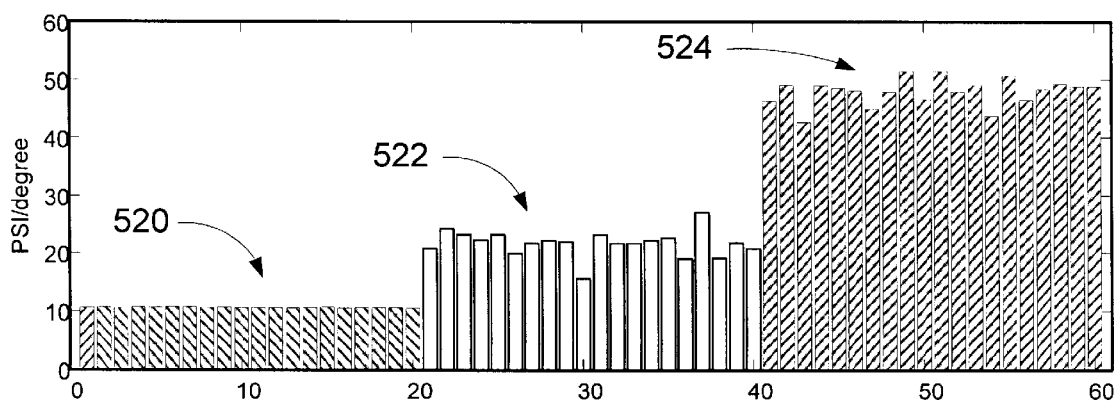
FIG. 5d is a graphical illustration of experimental data showing a correlation between the peak of the derivative of pressure of an engine cylinder as a function of crank angle and incipient knock and severe knock of the spark plug design of FIG. 5a that is used in sizing the floating bounded space of the present invention.

As previously indicated, there are some spark plug configurations (and ionization probe configurations) where the ionization signal does not have a second peak. In systems having these types of configurations, knock is present when there is a large first peak in the ionization signal. Turning now to FIGS. 5a–5d, the floating bounded space 500 for configurations having no second peak is subdivided to include a lower portion 502 and an upper portion 504 to detect the incipient knock and severe knock. FIG. 5a is an illustration of a representative cylinder pressure 506 and ionization signal 508 of a normal combustion condition. FIG. 5b is an illustration of a representative cylinder pressure 510 and ionization signal 512 for an incipient knock condition. FIG. 5c is an illustration of a representative cylinder pressure 514 and ionization signal 516 for a severe knock condition. A representative set of data points of the engine parameter is shown in FIG. 5d. Acceptable knock 520, incipient knock 522, and severe knock 524 levels are shown. The engine parameter used is the peak of the derivative of pressure of a cylinder with respect to engine crank angle. A threshold level of the peak of the derivative of pressure of a cylinder is chosen for incipient knock and a threshold level of the peak of the derivative of pressure of a cylinder is chosen for severe knock. The threshold level for incipient knock is chosen such that the knock won't cause immediate damage to the engine. The threshold level for severe knock is chosen such that the knock is about to do some damage to the engine. If the peak of the derivative of pressure of a cylinder is below the threshold level for incipient knock, any knock present is within an acceptable level of knock. If the peak of the derivative of pressure of a cylinder is above the threshold level for incipient knock and below the threshold for severe knock, the knock is defined as incipient knock. If the peak of the derivative of pressure of a cylinder is above the threshold level for severe knock, the knock is defined as severe knock. In one embodiment, the threshold level selected for incipient knock is set to a value of 15 and the threshold level for severe knock is set to a value of 45. Other values may be used. The starting point and size of the lower portion is determined by adjusting the starting point and size until the lower portion is of sufficient size and at a location with respect to the ionization signal and crank angle such that any portion of the ionization signal for an incipient knock condition reliably falls within the lower portion 502 and remains outside the upper portion 504 as illustrated in FIG. 5b. The starting point and size of the upper portion is determined by adjusting the starting point and size until the lower portion is of sufficient size and at a location such that any portion of the ionization signal for a severe knock condition reliably falls within the upper portion 504 as illustrated in FIG. 5c.

In one embodiment, the starting point is a fixed amount of time after the ignition event and the duration of the floating box 500 is a fixed amount of time. This time can be in terms of actual time or in terms of crank angle and is determined from the data points illustrated in FIG. 5*d*. The ionization signal eventually goes to quasi steady state value. The bottom of the lower portion 502 is set to a point a fixed amount above the quasi steady state value and the top of the lower portion 502 is determined from the data points. The fixed amount above the quasi steady state value is determined from the data points and is set to a location such that the ionization signals of normal combustion conditions do not fall within the floating box 500. The top of the lower portion is determined such that incipient knock conditions fall within the lower portion 502 and remain outside the upper portion 504. During operation, the quasi steady state value is determined and the lower portion 502 of the floating box 500 is placed at the fixed amount of time after the ignition event at the fixed amount above the quasi steady state value. The ionization signal analyzer 132 provides an indication to the ionization signal control module 134 that incipient knock has been detected if the analyzer determines that the ionization signal falls within the lower portion 502 while remaining outside the upper portion 504. The ionization signal analyzer 132 provides an indication to the ionization signal control module 134 that severe knock has been detected if the analyzer determines that the ionization signal falls within the upper portion 504.

The ionization signal control module 134 provides an indication to the air/fuel module 104 of the incipient knock conditions and the severe knock conditions and to other modules such as the engine controller. The air/fuel module 104 and spark module 106 (or the engine controller), in turn, determines what action to take. The actions that can be taken include retarding the ignition timing, running the engine leaner (e.g., adding more air to the air/fuel mixture), or shutting down the engine. The air/fuel module 104 controls fuel injection 124 and/or throttle valve 126 and spark module 106 controls the spark timing to move the engine away from the knock condition by retarding the ignition timing and/or running the engine leaner, or shutting down the engine.

Turning now to FIG. 6, the steps of determining abnormal combustion conditions of a lean burn reciprocating engine are shown. While the steps will be described sequentially, it is recognized that the steps may be performed sequentially, in parallel, a combination of sequentially and parallel, and in different order. One or more ionization signals of the lean burn reciprocating engine for cycles (i.e., combustion events) of a running engine is obtained (step 600).

The ionization signal is processed for signal stability and a resultant ionization signal is determined (step 602). A start point of the resultant ionization signal and a peak for the resultant ionization signal is determined using an initial level for all of the signals (step 604). The ionization signal is checked to determine if a portion of an ionization signal is within a floating bounded space 300, 400, 500 (step 606). An indication is provided if a portion of an ionization signal is within a floating bounded space 300, 400, 500 (step 608). The air/fuel module 104 and spark module 106 (or the engine controller), in turn, determine what actions to take. The actions that can be taken include advancing or retarding the ignition timing, running the engine leaner or richer, or shutting down the engine. The air/fuel module 104 controls fuel injection 124 and/or throttle valve 126 and spark module 106 controls the spark timing to move the engine away from the abnormal combustion condition or shuts down the engine.

Figure 7:
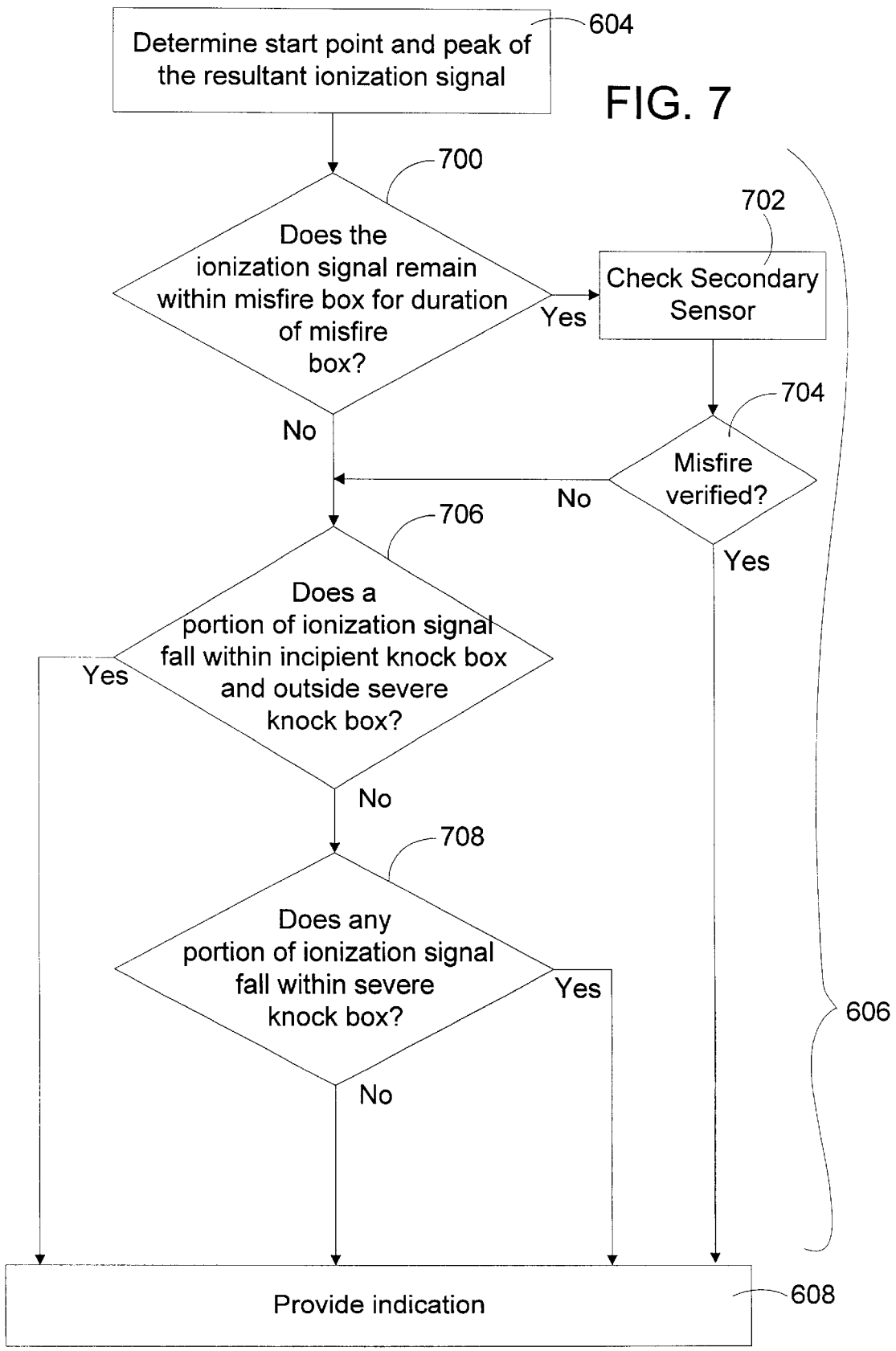
FIG. 7 is a flow chart illustrating the steps to determine the abnormal combustion condition of FIG. 6.

Turning to FIG. 7, step 606 includes determining if a portion of an ionization signal is within floating bounded space 300 for the duration of the floating bounded space 300 (step 700). Some engines have sensors or other engine performance indicators that can be used as a secondary sensor to verify that a misfire has occurred. If a portion of the ionization signal is within the floating bounded space for an extended interval corresponding to the duration of the floating bounded space and a secondary sensor is available on the engine, the secondary sensor is checked (step 702) to verify that a misfire has occurred. If available, the secondary sensor is used to eliminate the possibility that that drift of the flame kernel produced by the spark plug 120 has moved out of the spark gap 122 before the ionization module 102 has detected the ionization signal. The secondary sensor is checked to see if the engine is operating normally. FIG. 8 illustrates the secondary sensor. The secondary sensor 190 provides a secondary signal 192 to the ionization module 102. The secondary signal 192 may be a pressure signal 194, exhaust temperature 196, IMEP, instantaneous crank angle velocity 198, or other signals such as from an oxygen sensor and the like. If the secondary signal provides confirmation that a misfire has occurred (step 704), an indication of misfire is provided (step 608).

The ionization signal is also checked to determine if any portion of the ionization signal falls within the lower portion 402, 502 floating bounded space 400, 500, and no portion falls within the upper portion 404, 504 of floating bounded space 400, 500 (step 706). If any portion of the ionization signal falls within the lower portion 402, 502 floating bounded space 400, 500, and no portion falls within the upper portion 404, 504 of floating bounded space 400, 500, an indication of incipient knock is provided (step 608).

The ionization signal is also checked to determine if any portion of the ionization signal falls within upper portion 404, 504 of floating bounded space 400, 500 (step 708). If any portion of the ionization signal falls within the upper portion 404, 504 of floating bounded space 400, 500, an indication of severe knock is provided (step 608). Steps 600–608 are repeated for subsequent combustion events.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

An apparatus and method to detect abnormal combustion conditions for use in a feedback control in a lean burn reciprocating engine using ionization signals has been described. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for detecting an abnormal combustion condition in a spark ignited combustion chamber of a lean burn reciprocating engine, the abnormal combustion condition comprising one of a misfire and a knock, the method comprising the steps of:

detecting the variation of an ionization signal that changes with respect to an engine parameter over a combustion event of the lean burn reciprocating engine operating with an air to fuel ratio corresponding to a $\lambda$ greater than 1.4;

associating a floating bounded space with the ionization signal;

determining if a portion of the ionization signal is within the floating bounded space; and providing an indication that the abnormal combustion condition has been detected if the portion of the ionization signal is within the floating bounded space.

2. The method of claim 1 further comprising the step of detecting the ionization signal wherein the engine is operating with an air to fuel ratio corresponding to a $\lambda$ greater than 1.4.

3. The method of claim 1 wherein the abnormal combustion condition is a misfire and the step of determining if the portion of the ionization signal is within the floating bounded space comprises the step of determining if the portion of the ionization signal remains within the floating bounded space for an extended interval corresponding to the duration of the floating bounded space.

4. The method of claim 3 further comprising the step of confirming that the misfire has occurred by checking a secondary sensor.

5. The method of claim 1 wherein the abnormal combustion condition is knock and the step of determining if the portion of the ionization signal is within the floating bounded space comprises the step of determining if any portion of the ionization signal is within the floating bounded space.

6. The method of claim 5 wherein the floating bounded space comprises a first portion and a second portion and the step of determining if the portion of the ionization signal is within the floating bounded space comprises the step of determining if any portion of the ionization signal is within one of the first portion and the second portion.

7. The method of claim 6 wherein the step of providing the indication comprises the step of providing one of an indication of incipient knock if said any portion of the ionization signal is within the first portion and not the second portion and an indication of severe knock if said any portion of the ionization signal is within the second portion.

8. The method of claim 1 further comprising the step of adjusting at least one of a position and size of the floating bounded space as a function of engine operating conditions, the engine operating conditions including at least one of an engine speed, an engine load, and a desired air/fuel ratio.

9. The method of claim 1 further comprising the step of adjusting a combustion parameter if the abnormal combustion condition has been detected.

10. The method of claim 9 wherein the abnormal engine condition is misfire and the step of adjusting the combustion parameter comprises at least one of adjusting the ignition timing and reducing the air/fuel ratio.

11. The method of claim 9 wherein the abnormal engine condition is knock and the step of adjusting the combustion parameter comprises at least one of retarding the ignition timing and adjusting the air/fuel ratio.

12. A method of identifying abnormal combustion cycles in a lean burn reciprocating engine, the abnormal combustion cycles being characterized by an abnormal event, the method comprising the steps of:

a) collecting ionization signals relating ionization current to engine rotational position for a plurality of successive combustion cycles of the lean burn reciprocating engine, some of the combustion cycles being normal, and others of the combustion cycles being characterized by the abnormal event;

b) identifying a characteristic of the ionization signal for the abnormal combustion cycles which distinguishes from the ionization signal for the normal combustion cycles;

c) associating at least one floating bounded space with the ionization signals and adjusting the position and size of the floating bounded space so that the floating bounded space captures the characteristic which distinguishes the abnormal combustion cycles; and d) testing subsequently generated ionization signals with the floating bounded space to distinguish between normal and abnormal combustion cycles of the lean burn reciprocating engine.

13. The method of claim 12 wherein the engine is operating with an air to fuel ratio corresponding to a $\lambda$ greater than 1.4, the method further comprising the step of detecting the ionization signals.

14. The method of claim 12 further including the steps of identifying a second characteristic of the ionization signal which distinguishes a second abnormal event from both the normal signal and the abnormal event, and repeating steps c–d for the second abnormal event.

15. The method of claim 14 wherein the abnormal event is incipient knock and the second abnormal event is severe knock.

16. The method of claim 12 wherein the abnormal event is one of misfire and knock.

17. The method of claim 12 further comprising the step of providing an indication if an abnormal event is detected.

18. The method of claim 12 wherein the step of adjusting the position and size of the floating bounded space includes adjusting at least one of the position and the size of the floating bounded space as a function of engine operating conditions, the engine operating conditions including at least one of an engine speed, an engine load, and a desired air/fuel ratio.

19. The method of claim 12 wherein the abnormal event is misfire and the step of associating at least one floating bounded space with the ionization signals and adjusting the position and size of the floating bounded space comprises the steps of:

establishing a start engine rotational position;

determining a duration of the floating bounded space;

determining a lowest ionization signal level over the duration; and adjusting the position of the floating bounded space at the start engine rotational position to the lowest ionization signal level.

20. The method of claim 12 further comprising the step of segregating the ionization signals into ionization signals for normal combustion cycles and ionization signals for abnormal combustion cycles based upon an engine parameter that can be used to identify whether the combustion cycle associated with an ionization signal is an abnormal combustion cycle or a normal combustion cycle.

21. The method of claim 20 wherein the engine parameter is indicated mean effective pressure.

22. The method of claim 20 wherein the engine parameter is the peak of the derivative of cylinder pressure.

23. A method to detect an abnormal combustion condition of a lean burn reciprocating engine comprising the steps of:
   associating a floating bounded space with an ionization signal such that the floating bounded space captures a characteristic of the ionization signal which distinguishes the abnormal combustion condition from a normal combustion condition for an engine operating with an air to fuel ratio corresponding to a λ greater than 1.4;
   detecting the variation of an ionization signal with respect to an engine parameter over a combustion event; and
   providing an indication that the abnormal combustion condition has been detected if a portion of the ionization signal falls within the floating bounded space.

24. The method of claim 23 wherein the engine is operating with an air to fuel ratio corresponding to a λ greater than 1.4, the method further comprising the step of detecting the ionization signal.

25. The method of claim 23 wherein the abnormal combustion condition is a misfire and the step of providing the indication comprises the step of providing the indication if the portion of the ionization signal remains within the floating bounded space for an extended interval corresponding to the duration of the floating bounded space.

26. The method of claim 23 wherein the abnormal combustion condition is knock and the step of providing the indication comprises the step of providing an indication of knock if any portion of the ionization signal is within the floating bounded space.

27. The method of claim 23 wherein the floating bounded space comprises a first portion and a second portion, and the step of providing an indication of knock comprises the step of providing one of an indication of incipient knock if any portion of the ionization signal is within the first portion and outside the second portion and an indication of severe knock if any portion of the ionization signal is within the second portion.

28. A method to determine a floating bounded space and a starting point for the floating bounded space used to determine an abnormal combustion condition comprising the steps of:
   receiving a set of ionization signals that change with respect to an engine parameter over a combustion event, the set having ionization signals corresponding to normal combustion conditions and ionization signals corresponding to at least one abnormal combustion condition for an engine operating with an air to fuel ratio corresponding to a λ greater than 1.4;
   adjusting the starting point and a size of the floating bounded space such that selected portions of the ionization signals corresponding to the at least one abnormal combustion condition reliably fall within the floating bounded space and the ionization signals corresponding to normal combustion conditions reliably fall outside the floating bounded space.

29. The method of claim 28 wherein the at least one abnormal combustion condition is a misfire and the step of adjusting the starting point and the size comprises the step of adjusting at least one of the starting point and the region such that the selected portion of the ionization signals corresponding to the at least one abnormal combustion condition reliably remains within the floating bounded space for an extended interval corresponding to the duration of the floating bounded space and the ionization signals corresponding to the normal combustion conditions reliably fall outside of the floating bounded space.

30. The method of claim 28 wherein the at least one abnormal combustion condition is a knock, the selected portion of the ionization signal is any portion of the ionization signal and the step of adjusting the at least one of the starting point and the region comprises the step of adjusting at least one of the starting point and the size such that the selected portion of the ionization signals corresponding to the at least one abnormal combustion condition reliably falls within the floating bounded space and the ionization signals corresponding to the normal combustion conditions reliably fall outside of the floating bounded space.

31. The method of claim 28 wherein the floating bounded space has an upper portion and a lower portion, the knock is an incipient knock and the step of adjusting the at least one of the starting point and the size comprises the step of adjusting at least one of the starting point and the size such that selected portion of the ionization signals corresponding to the at least one abnormal combustion condition reliably falls within the lower portion and outside the upper portion and the ionization signals corresponding to the normal combustion conditions reliably fall outside the floating bounded space.

32. The method of claim 28 wherein the floating bounded space has an upper portion and a lower portion, the knock is an severe knock and the step of adjusting the at least one of the starting point and the region comprises the step of adjusting at least one of the starting point and the region such that the selected portion of the ionization signals corresponding to the at least one abnormal combustion condition reliably falls within the upper portion and the ionization signals corresponding to the normal combustion conditions reliably fall outside the upper portion.

33. The method of claim 28 wherein the floating bounded space is a floating box.

34. The method of claim 28 wherein the step of adjusting the starting point and the size of the floating bounded space includes adjusting at least one of the starting point and the size of the floating bounded space as a function of engine operating conditions, the engine operating conditions including at least one of an engine speed, an engine load, and a desired air/fuel ratio.

35. A method to detect an abnormal combustion condition of a lean burn reciprocating engine comprising the steps of:
   associating a floating bounded space with an ionization signal such that the floating bounded space captures a characteristic of the ionization signal which distinguishes the abnormal combustion condition from a normal combustion condition for an engine operating with an air to fuel ratio corresponding to a λ greater than 1.4;
   detecting the variation of an ionization signal with respect to an engine parameter over a combustion event;
   detecting if a portion of the ionization signal falls within the floating bounded space; and adjusting at least one combustion parameter if the portion of the ionization signal falls within the floating bounded space.

36. The method of claim 35 further comprising the step of providing an indication that the abnormal combustion condition has been detected if the portion of the ionization signal falls within the floating bounded space.

37. The method of claim 35 wherein the abnormal engine condition is misfire and the step of adjusting the combustion parameter comprises at least one of adjusting the ignition timing and reducing the air/fuel ratio.

38. The method of claim 35 wherein the abnormal engine condition is knock and the step of adjusting the combustion parameter comprises at least one of retarding the ignition timing and adjusting the air/fuel ratio.

39. An electronic system for detecting an abnormal combustion condition of a lean burn reciprocating engine comprising:

an ionization signal detector for detecting an ionization signal that changes with respect to an engine parameter over a combustion event of the lean burn reciprocating engine operating with an air to fuel ratio corresponding to a $\lambda$ greater than 1.4;

an ionization signal analyzer which detects the variation of the ionization signal and determines if a portion of the ionization signal is within a floating bounded space that is associated with the ionization signal, the ionization signal analyzer in communication with the ionization signal detector; and an ionization signal control module communication with the ionization signal analyzer and the ionization signal detector, the ionization signal control module providing an indication that the abnormal combustion condition has been detected if the ionization signal analyzer determines if the portion of the ionization signal is within the floating bounded space.

40. The electronic system of claim 39 wherein the ionization signal control module provides an indication of misfire if the portion of the ionization signal remains within the floating bounded space for an extended interval corresponding to the duration of the floating bounded space.

41. The electronic system of claim 39 wherein the ionization signal control module provides an indication of incipient knock if any portion of the ionization signal is within a first portion of the floating bounded space and outside a second portion of the floating bounded space and an indication of severe knock if any portion of the ionization signal is within the second portion.

* * * * *